(12) United States Patent
Funaba et al.

(10) Patent No.: US 8,970,155 B2
(45) Date of Patent: Mar. 3, 2015

(54) POWER INVERTER

(75) Inventors: Seiji Funaba, Hitachinaka (JP); Yasuo Noto, Hitachinaka (JP); Masashige Tsuji, Hitachinaka (JP); Keiji Kunii, Hitachiota (JP); Koichi Yahata, Hitachinaka (JP); Shinichiro Hida, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 13/981,476

(22) PCT Filed: Feb. 21, 2012

(86) PCT No.: PCT/JP2012/054128
§ 371 (c)(1),
(2), (4) Date: Jul. 24, 2013

(87) PCT Pub. No.: WO2012/117893
PCT Pub. Date: Sep. 7, 2012

(65) Prior Publication Data
US 2013/0328514 A1 Dec. 12, 2013

(30) Foreign Application Priority Data
Mar. 3, 2011 (JP) ................................ 2011-046167

(51) Int. Cl.
H02P 1/00 (2006.01)
H02P 27/06 (2006.01)
(Continued)

(52) U.S. Cl.
CPC ............. *H02P 27/06* (2013.01); *H02P 27/08* (2013.01); *H02P 29/024* (2013.01); *H02M 1/084* (2013.01); *H02M 7/53871* (2013.01); *H02M 2001/0006* (2013.01)
USPC ........................................... 318/519

(58) Field of Classification Search
USPC ................................. 318/519, 494
See application file for complete search history.

(56) References Cited

U.S. PATENT DOCUMENTS 8,798,832 B2 * 8/2014 Kawahara et al. ............... 701/22
2004/0027839 A1 * 2/2004 Deng et al. ....................... 363/37
(Continued)

FOREIGN PATENT DOCUMENTS

JP 2001-37244 A 2/2001
JP 2002-17098 A 1/2002
(Continued)

OTHER PUBLICATIONS

Corresponding International Search Report with English Translation dated Apr. 17, 2012 (three (3) pages).

*Primary Examiner* — Bentsu Ro
*Assistant Examiner* — Zoheb Imtiaz
(74) *Attorney, Agent, or Firm* — Crowell & Moring LLP

(57) ABSTRACT

An electric power converter is provided with a plurality of power-conversion elements; a first control circuit that outputs a first control signal; an electricity storage circuit; a second control circuit that outputs a second control signal when the direct-current power source that supplies electrical power to the first control circuit is not normal; and a drive circuit that outputs drive signals for driving the plurality of power-conversion elements. Each of the power-conversion elements is either a power-conversion element of the upper arm connected to the high-voltage side or a conversion element of the lower arm connected to the low-voltage side. In cases when the voltage of the electricity storage circuit is at a higher predetermined first voltage value, the second control circuit outputs a second control signal so that all the power-conversion elements of the upper arm or the lower arm are turned on and the others are turned off.

6 Claims, 13 Drawing Sheets

(51) Int. Cl.
*H02P 27/08* (2006.01)
*H02P 29/02* (2006.01)
*H02M 1/084* (2006.01)
*H02M 7/5387* (2007.01)
*H02M 1/00* (2006.01)

(56) References Cited

U.S. PATENT DOCUMENTS

2007/0216469 A1 9/2007 Sakamoto
2009/0103338 A1* 4/2009 Nakamura ............ 363/89
2010/0079093 A1* 4/2010 Kitanaka ............ 318/400.3
2013/0119903 A1* 5/2013 Weiss et al. ............ 318/400.3
2013/0121051 A1* 5/2013 Weiss et al. ............ 363/131
2014/0126262 A1* 5/2014 Lu et al. ............ 363/131

FOREIGN PATENT DOCUMENTS

| JP | 2007-288992 A | 11/2007 |
| JP | 2008-271687 A | 11/2008 |
| JP | 2009-284747 A | 12/2009 |

* cited by examiner

FIG. 11

| UP | UN | UP1 | UN1 |
|----|----|-----|-----|
| H  | H  | H   | H   |
| H  | L  | H   | L   |
| L  | H  | L   | H   |
| L  | L  | H   | H   |

POWER INVERTER

TECHNICAL FIELD

The present invention relates to a power inverter that converts DC (Direct Current) power into AC (Alternate Current) power.

BACKGROUND ART

There is a power inverter that is mounted on an electrical-powered vehicle such as an electrical vehicle (EV) or a hybrid electrical vehicle (HEV) and is connected to a driving electrical motor. The power inverter has a power conversion function of converting DC power supplied from a DC power source and used to drive an electrical motor into AC power or converting AC power generated from the electrical motor into DC power for charging the DC power source. To realize the power conversion function, a switching element such as a MOSFET (Metal-Oxide Semiconductor Field-Effect Transistor) or an IGBT (Insulated Gate Bipolar Transistor) is generally used in the power inverter. When a voltage greater than a predetermined resistance voltage is applied, resistance voltage breakdown may occur and thus the switching element may be damaged. Accordingly, the applied voltage is required not to be greater than the resistance voltage.

In a general electrical-powered vehicle, in order to efficiently use power, an electrical motor is forcibly rotated at the time of braking or at the time of downhill driving so as to work as a generator and a regenerative voltage (back-electromotive force) is generated to charge a DC power source. However, a higher regenerative voltage is generated as the number of times that the electrical motor is rotated increases. Therefore, when the regenerative voltage is greater than the resistance voltage, the resistance voltage breakdown may occur in a switching element. Accordingly, to prevent the resistance voltage breakdown, means for suppressing an overvoltage is provided in a conventional power inverter.

For example, PTL 1 suggests a method of suppressing an overvoltage in the following way in an electrical motor control device controlling an electrical motor. In this method, by turning on a switching element depending on a rotation position of the electrical motor under the control of a CPU when an overvoltage occurs, a plurality of phases of the electrical motor is connected in series.

Further, PTL 2 describes the following method. In this method, a regenerative voltage input from an inverter to a DC power source is detected. Inverter control means controls a switching element of the inverter so that opening or short-circuiting between lines of an electrical motor driving device and an electrical motor is performed by at least one of the electrical motor driving device and the electrical motor based on the detection result.

CITATION LIST

Patent Literature

PTL 1: JP 2002-17098 A
PTL 2: JP 2009-284747 A

SUMMARY OF INVENTION

Technical Problem

In the above-described conventional methods of suppressing an overvoltage, when an overvoltage occurs, the CPU or the inverter control means controls the switching element such that an output terminal of the electrical motor is connected to a reference potential (ground terminal) of a power source. Thus, the overvoltage is suppressed by a current flowing backward between the electrical motor and the reference potential (ground terminal). The CPU or the inverter control means performing such control is generally operated by a power source such as a 12 V power source supplied from a controlling power source circuit installed separately from the DC power source that supplies DC power for driving the electrical motor. Therefore, when an overvoltage occurs in a state in which the controlling power source circuit does not normally operate, the switching element may not be controlled. As a result, there is a problem that the overvoltage may not be suppressed.

Solution to Problem

A power inverter according to a first aspect of the invention includes: a plurality of power conversion elements that convert DC power supplied from a first DC power source into AC power used to drive an electrical motor; a first control circuit to which power is supplied from a second DC power source and which outputs a first control signal configured to control an operation of the plurality of power conversion elements; an electric storage circuit that stores the DC power by performing charging based on AC power generated by the electrical motor; a power source circuit that supplies power based on the first DC power source or the DC power supplied from the electric storage circuit; a voltage measurement circuit that measures a voltage of the electric storage circuit; a second control circuit to which the power is supplied from the power source circuit and which determines whether the second DC power source is normal and outputs a second control signal configured to control the operation of the plurality of power conversion elements based on the voltage of the electric storage circuit measured by the voltage measurement circuit, when determining that the second DC power source is not normal; and a driving circuit to which the power is supplied from the power source circuit and which outputs a driving signal configured to operate the plurality of power conversion elements based on the first or second control signal, wherein the plurality of power conversion elements are one of power conversion elements of an upper arm connected to a high-voltage side of the first DC power source and power conversion elements of a lower arm connected to a low-voltage side of the first DC power source, and a plurality of series circuits in which the power conversion elements of the upper arm and the power conversion elements of the lower arm are connected in series are connected in parallel to the electric storage circuit with respect to the first DC power source, and wherein, when the voltage of the electric storage circuit is greater than a predetermined first voltage value, the second control circuit outputs the second control signal configured to turn on all of one of the power conversion elements of the upper arm and the power conversion elements of the lower arm and turn off all of the other thereof.

According to a second aspect of the invention, in the power inverter according to the first aspect, when the voltage of the electric storage circuit is equal to or less than a predetermined second voltage value lower than the first voltage value, the second control circuit preferably outputs the second control signal configured to turn off all of the power conversion elements of the upper arm and the power conversion elements of the lower arm.

According to a third aspect of the invention, in the power inverter according to the first or second aspect, when the second control circuit controls the second control signal and determines that the second DC power source is normal, the second control circuit preferably interrupts the control on the second control signal.

According to a fourth aspect of the invention, the power inverter according to any one of the first to third aspects may further include a controlling signal output circuit that outputs a controlling signal indicating whether the second control circuit controls the second control signal to the first control circuit.

According to a fifth aspect of the invention, in the power inverter according to the fourth aspect, the first control circuit preferably does not output the first control signal, when the controlling signal output circuit outputs the controlling signal indicating that the second control circuit controls the second control signal.

According to a sixth aspect of the invention, in the power inverter according to any one of the first to fifth aspects, the voltage measurement circuit may be realized using a microcomputer that is operated by the power supplied from the power source circuit.

Advantageous Effects of Invention

According to the invention, an overvoltage can be suppressed, even when the overvoltage occurs in a state in which a controlling power source circuit does not normally operate.

BRIEF DESCRIPTION OF DRAWINGS

FIG. 11 is a diagram illustrating a true value table of input and output of the simultaneous ON prevention circuit.

Figure 1:
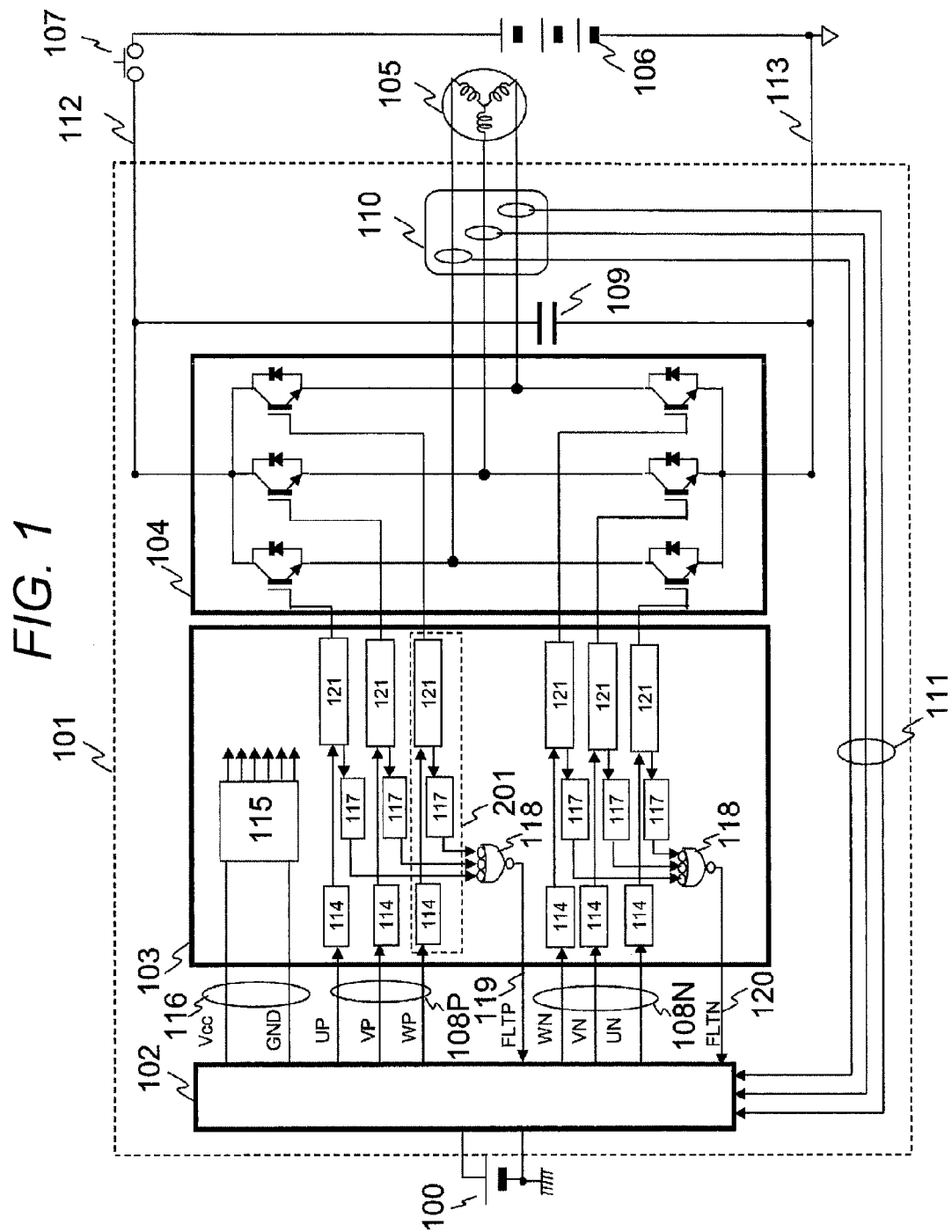
FIG. 1 is a block diagram illustrating an example of an electrical circuit configuration of a conventional power inverter for driving a 3-phase electrical motor.

DESCRIPTION OF EMBODIMENTS (Description of Related Art)
First, the related art will be below described before the present invention is described.
(Configuration of Inverter)
FIG. 1 is a block diagram illustrating an example of an electrical circuit configuration of an inverter 101 serving as a conventional power inverter for driving a 3-phase electrical motor. The inverter 101 illustrated in FIG. 1 mainly includes an electrical motor control board 102, a gate drive board 103, an IGBT module 104 including a plurality of IGBTs serving as switching elements, a smoothing capacitor 109, and a current sensor 110. The IGBT module 104 is connected to an electrical motor driving high-voltage power source 106 which is a DC power source by a positive wiring 112 and a negative wiring 113. Here, the positive wiring 112 is connected to the positive side (high-voltage side) of the high-voltage power source 106 via a contactor 107. The negative wiring 113 is connected to the negative side (low-voltage side) of the high-voltage power source 106. An inverter 101 is connected to a 3-phase electrical motor 105.

In the IGBT module 104, two-stage N-type IGBTs operating as switching elements are connected in series (totem pole connection) between the positive wiring 112 and the negative wiring 113. Of the two IGBTs, the IGBT connected to the side of the positive wiring 112, that is, the high-voltage side of the high-voltage power source 106 is referred to as an upper arm, and the IGBT connected to the side of the negative wiring 113, that is, the low-voltage side of the high-voltage power source 106 is referred to as a lower arm. In the inverter 101, outputs of a total of 3 phases of a U phase, a V phase, and a W phase are necessary in order to drive the 3-phase electrical motor 105. Therefore, three series circuits connecting the upper and lower arms in series are included in the IGBT module 104. The series circuits corresponding to the respective phases are connected in parallel to the high-voltage power source 106. A common terminal connecting an emitter of the upper arm to a collector of the lower arm in the series circuit of each phase is connected to the 3-phase electrical motor 105 via an output terminal of the inverter 101.

A reflux diode (FWD) is connected between the collector and the emitter of each IGBT of the IGBT module 104. The cathode of the reflux diode is connected to the collector side of the IGBT and the anode of the reflux diode is connected to the emitter side of the IGBT.

The smoothing capacitor 109 suppresses variation in a DC voltage generated through a switching operation performed by each IGBT of the IGBT module 104 and is connected in parallel to the IGBT module 104 between the positive wiring 112 and the negative wiring 113. That is, the series circuits of the upper and lower arms of the IGBT module 104 are each connected in parallel to the smoothing capacitor 109 with respect to the high-voltage power source 106.

(Gate Drive Board)
The gate drive board 103 includes one gate drive circuit 201 for each IGBT of the IGBT module 104. That is, the gate drive board 103 includes six gate drive circuits 201. Of the six gate drive circuits 201, three gate drive circuits correspond to the IGBTs of the upper arm, respectively, and the remaining three gate drive circuits correspond to the IGBTs of the lower arm, respectively. The gate drive board 103 further includes a power source circuit 115 and two AND circuits 118 corresponding to the upper and lower arms, respectively.

The power source circuit 115 receives a power source voltage 116 (a Vcc voltage and a GND voltage) output from the electrical motor control board 102 and supplies power sources insulated from the power source voltage 116 to each of the six gate drive circuits 201 based on the power source voltage 116. Thus, each gate drive circuit 201 operates using the power source supplied from the power source circuit 115.

Each gate drive circuit 201 includes a driver circuit 121, a coupler 114 to which gate control signals 108P (gate control signals UP, VP, and WP) and 108N (gate control signals UN, VN, and WN) output from the electrical motor control board 102 to the upper and lower arms of the respective phases are input and from which the gate control signals 108P and 108N are output to the driver circuit 121, and a coupler 117 to which a fault signal output from the driver circuit 121 at an abnormal time is input and from which the fault signal is output to the AND circuit 118. For example, when the W phase of the upper arm is described as an example, the gate control signal WP of the upper arm W phase is input from the electrical motor control board 102 to the coupler 114 of the gate drive circuit 201 corresponding to the W phase of the upper arm.

The fault signal output from the driver circuit 121 is a negative logic signal and an 'H' level signal is output at a normal time. When an abnormal state such as an abnormal decrease in a power source voltage of the driver circuit 121 or occurrence of an overvoltage in the corresponding IGBT occurs, the driver circuit 121 changes the fault signal from the 'H' level to an 'L' level and outputs the changed fault signal.

Three fault signals output from the driver circuits 121 corresponding to the 3 phases of the upper arm are input to the AND circuit 118 of the upper arm via the couplers 117. When at least one of the fault signals becomes the 'L' level, the AND circuit 118 changes the output from an 'H' level to an 'L' level and outputs the changed output as an upper arm fault signal (FLTP signal) 119 to the electrical motor control board 102. That is, the AND circuit 118 of the upper arm becomes an OR circuit in negative logic. Therefore, when abnormality occurs in at least one of the 3 phases of the upper arm, the FLTP signal 119 with the 'L' level is output. The AND circuit of the lower arm has the same configuration. When abnormality occurs in at least one of the 3 phases of the lower arm, a lower arm fault signal (FLTN signal) 120 with the 'L' level is output from the AND circuit 118 of the lower arm to the electrical motor control board 102.

(Electrical Motor Control Board)

The electrical motor control board 102 is connected to a high-order control device (not illustrated), and thus an operation command is input from the control device to give an instruction of an operation state of the 3-phase electrical motor 105. Further, the magnitude of a current flowing in the 3-phase electrical motor 105 and detected by a current sensor 110 is input as a current sense signal 111 to the electrical motor control board 102. Based on the operation command and the current sense signal 111 input in this way, the electrical motor control board 102 outputs the gate control signals 108P and 108N used to control the operation of each IGBT of the IGBT module 104, that is, the gate control signals UP, VP, WP, UN, VN, and WN of each phase to each gate drive circuit 201 inside the gate drive board 103. The gate control signals output from the electrical motor control board 102 are negative logic signals. When the corresponding IGBT is turned off and turned on, the signal with the 'H' level and the signal with the 'L' level are output from the electrical motor control board 102, respectively. The electrical motor control board 102 operates by the power supplied from a 12 V power source 100 for a vehicle.

Here, there is a cautious point. That is, there is a difference between a reference potential of the electrical motor control board 102 and a reference potential of each gate drive circuit 201 inside the gate drive board 103. Specifically, since the 12 V power source 100 that supplies power to the electrical motor control board 102 is a power source for a vehicle, the reference potential is grounded to the body of the vehicle on which the inverter 101 is mounted. Thus, the reference potential of the electrical motor control board 102 is the potential of the body of the vehicle. On the other hand, the reference potential of the gate drive circuit 201 is different between the upper and lower arms. The reference potential of the gate drive circuit 201 of the upper arm is the same as the emitter voltage of the corresponding IGBT, that is, the potential of the output terminal of the inverter 101 connected to the 3-phase electrical motor 105. The reference potential of the gate drive circuit 201 of the lower arm is a negative potential of the high-voltage power source 106. The reference potentials are different from the reference potential of the electrical motor control board 102, that is, the potential of the body of the vehicle. Thus, the reference potential of the electrical motor control board 102 is different from the reference potential of each gate drive circuit 201 inside the gate drive board 103. Therefore, as described above, the power source circuit 115 supplies the power sources insulated from the power source voltage 116 output by the electrical motor control board 102 to the six gate drive circuits 201.

(Gate Drive Circuit)

Figure 2:
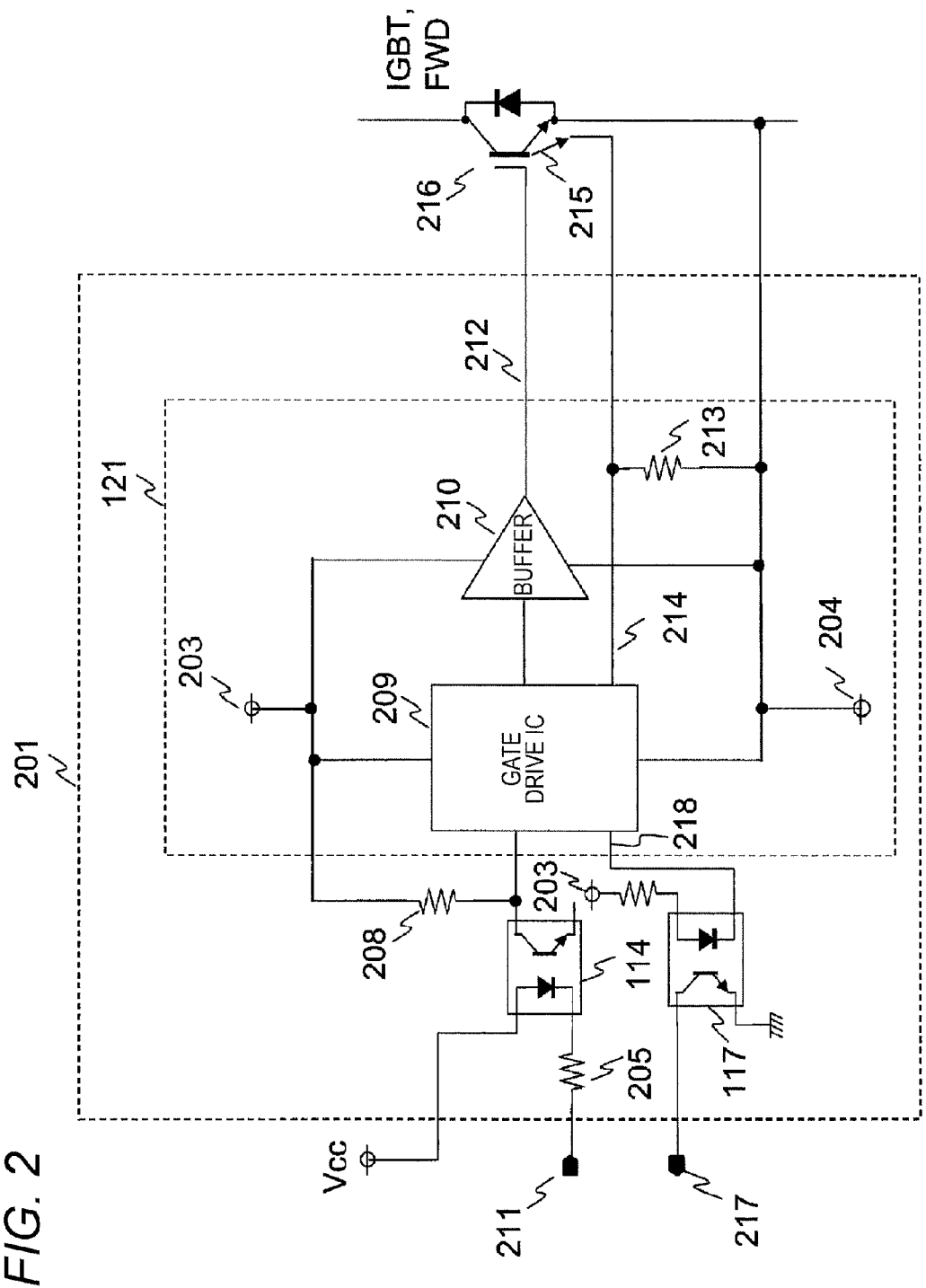
FIG. 2 is a block diagram illustrating an example of an electrical configuration of a gate drive circuit in the conventional power inverter for driving the 3-phase electrical motor.

FIG. 2 is a block diagram illustrating an example of an electrical configuration of the gate drive circuit 201. In the gate drive circuit 201 illustrated in FIG. 2, the driver circuit 121 mainly includes a gate drive IC 209 and a buffer 210, and the couplers 114 and 117 each include a photo-coupler. An operation of the gate drive circuit 201 will be described below. In the following description, the operation of the gate drive circuit 201 illustrated in FIG. 2 will be described using the W phase of the upper arm as an example. However, the same is also applied to the other gate drive circuits 201.

The gate control signal WP input from the electrical motor control board 102 to the gate drive circuit 201 via a gate control signal input terminal 211 is input to the gate drive IC 209 via the coupler 114. Here, a resistor 205 disposed between the gate control signal input terminal 211 and the coupler 114 is a current limitation resistor. The output of the coupler 114 is pulled up to power source 203 via a resistor 208. When the negative logic gate control signal WP is input from the electrical motor control board 102, the negative logic signal according to the voltage level of the power source 203 is output from the coupler 114 to the gate drive IC 209.

The reference potential of the gate control signal WP input from the electrical motor control board 102 is the same as the reference potential of the 12 V power source 100 that supplies the power to the electrical motor control board 102, as illustrated in FIG. 1. Further, the signal level of the gate control signal WP is 5 V which is the same as the Vcc power source in the electrical motor control board 102. On the other hand, a reference potential 204 of the driver circuit 121 including the gate drive IC 209 is the same as the reference potential of the above-described gate drive circuit 201, that is, is the same as the potential of the output terminal (in the case of the upper arm) of the inverter 101 connected to the 3-phase electrical motor 105 or the negative potential (in the case of the lower arm) of the high-voltage power source 106. Thus, there is the difference between the reference potential of the gate control signal WP input to the coupler 114 and the reference potential of the signal output from the coupler 114 and input to the gate drive IC 209. Further, the signal level of the gate drive IC 209 is 15 V which is higher than a gate threshold value voltage of the IGBT 216 driving a large current. That is, the coupler 114 serves as transmission of a signal insulated from the input signal to the gate drive IC 209 and also serves as conversion of the level of an input or output signal.

The gate drive IC 209 generates a gate driving signal 212 via the buffer 210 based on the gate control signal WP input via the coupler 114. When the gate driving signal is output to the corresponding IGBT 216, a voltage between the gate and the emitter in the IGBT 216 is given, and thus the IGBT 216 is turned on or off according to the gate driving signal. Further, the gate drive IC 209 and the buffer 210 operates by the power source 203 supplied for the reference potential 204 of the driver circuit 121.

Here, the IGBT 216 includes a sense emitter terminal 215. A current split weakly from a current flowing between the collector and the emitter of the IGBT 216 starts flowing from the sense emitter terminal 215 to a current sense resistor 213. When an overcurrent flows in the IGBT 216, the gate drive IC 209 can detect the overcurrent by measuring the current by voltage drop occurring in the current sense resistor 213, that is, an overcurrent detection signal 214. When it is detected that the overcurrent flows in the IGBT 216, the gate drive IC 209 outputs a signal with an 'L' level as a fault signal 218 to the coupler 117. The coupler 117 is turned on by the fault signal 218, and thus a fault signal with an 'L' level is output to the AND circuit 118 illustrated in FIG. 1 via the fault signal output terminal 217.

(AND Circuit)

Figure 3:
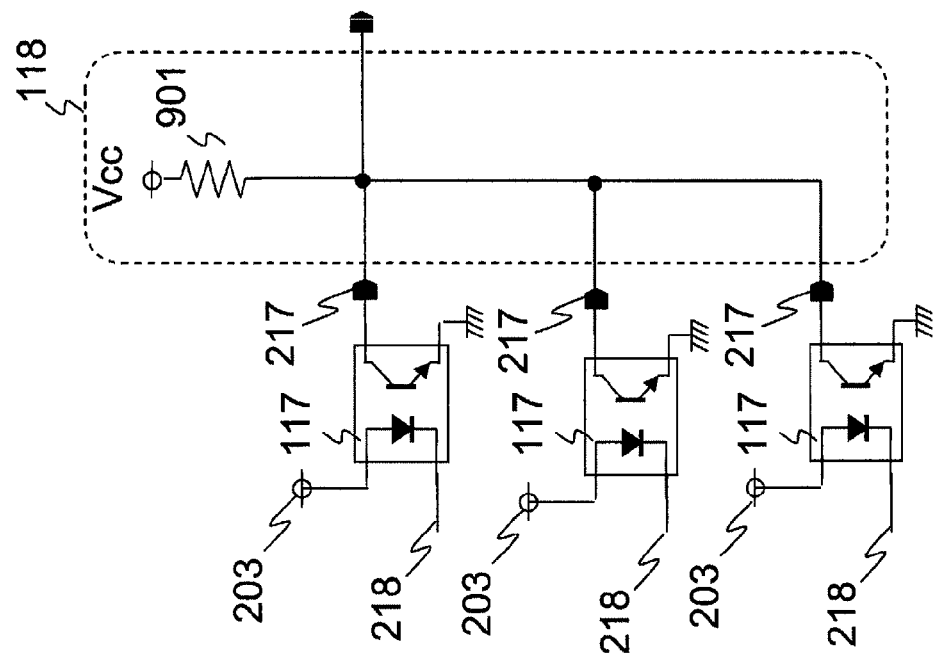
FIG. 3 is a circuit diagram illustrating an example of an AND circuit in the conventional power inverter for driving the 3-phase electrical motor.

FIG. 3 is a circuit diagram illustrating an example of the AND circuit 118. As illustrated in FIG. 3, on the input side of the AND circuit 118, collector outputs of the three couplers 117 included in the three gate drive circuits 201 corresponding to the 3 phases of the upper or lower arm are connected in a wired OR manner, that is, short-circuited via the fault signal output terminal 217. The AND circuit 118 can be configured such that the collector outputs are pulled up to the Vcc power source of the electrical motor control board 102 via a resistor 901. Thus, an OR circuit in negative logic, that is, the AND circuit 118 in positive logic is configured.

(Operation of Inverter)

Next, an overview of an operation of the inverter 101 will be described with reference to FIG. 1. The inverter 101 transmits the PWM type gate control signals UP, VP, WP, UN, VN, and WN denoted by reference numerals 108P and 108N from the electrical motor control board 102 to the six gate drive circuit 201 of the gate drive board 103 in order to switch each IGBT of the IGBT module 104. Here, since the reference potential of the electrical motor control board 102 is different from that of the gate drive board 103, as described above, the gate control signals are transmitted and received via the coupler 114, which is an insulated signal transmission device, between the electrical motor control board 102 and the gate drive board 103. Each gate drive circuit 201 provides a voltage between the gate and emitter terminals of the corresponding IGBT based on the input gate control signals to switch the IGBT. By switching each IGBT of the IGBT module 104 at a predetermined timing in this way, the DC power supplied from the high-voltage power source 106 is converted into AC power, the current flows to the electrical motor 105 via each IGBT, and thus the electrical motor 105 is driven. At this time, the current flowing in the electrical motor 105 is measured by the current sensor 110 and is fed back as a current sense signal 111 to the electrical motor control board 102. Thus, the electrical motor control board 102 controls the current flowing in the electrical motor 105 and controls the driving of the electrical motor 105.

The inverter 101 which is a conventional power inverter for driving a 3-phase electrical motor has the above-described configuration.

(First Embodiment)

Next, a power inverter according to a first embodiment of the invention will be described below with reference to FIGS. 4 to 8.

Configuration of Inverter

Figure 4:
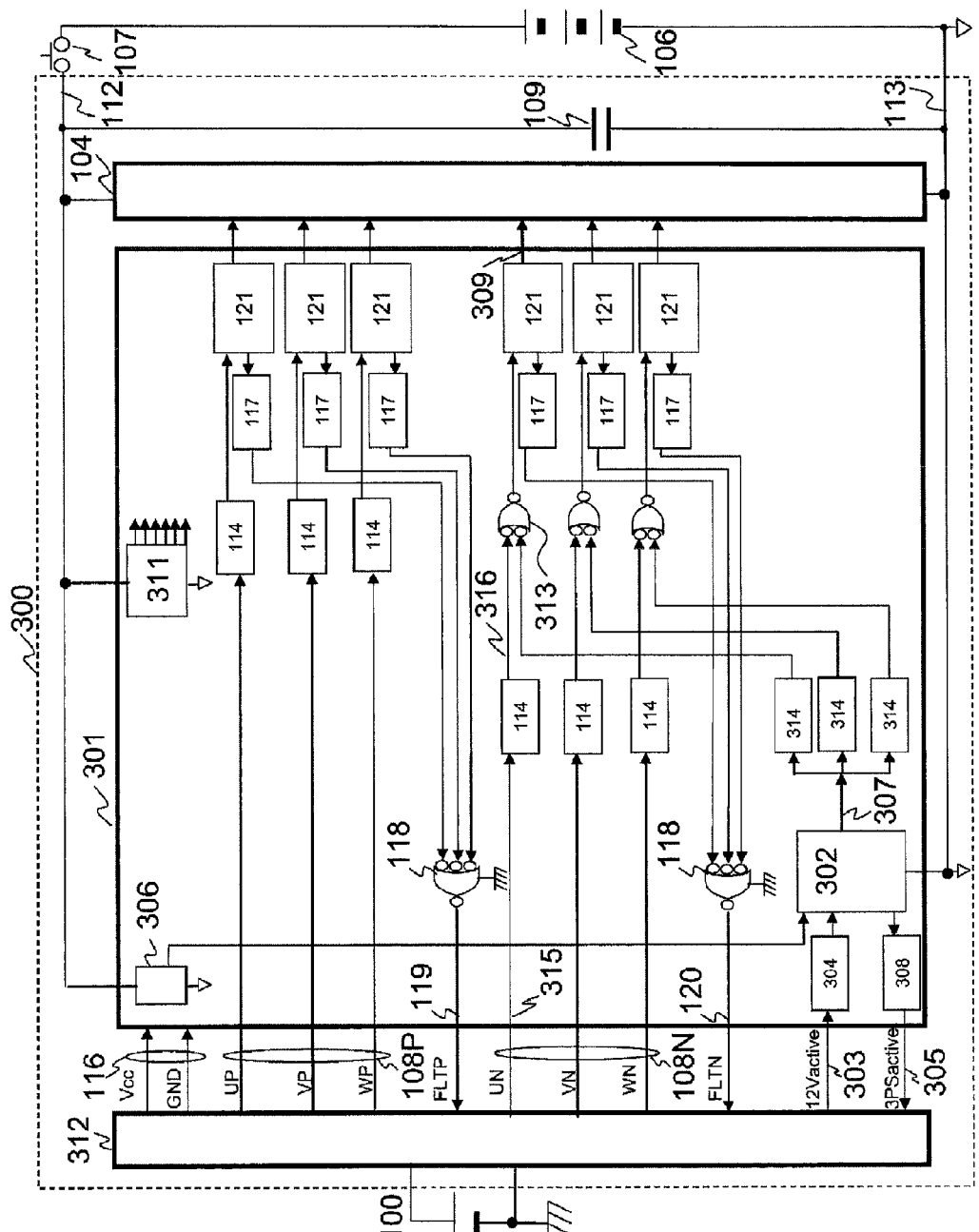
FIG. 4 is a block diagram illustrating an example of an electrical circuit configuration of a power inverter according to a first embodiment of the invention.

FIG. 4 is a block diagram illustrating an example of an electrical circuit configuration of an inverter 300 which is a power inverter according to the first embodiment of the invention. In FIG. 4, the same reference numerals are given to units common to those of the conventional inverter 101 illustrated in FIG. 1. The 3-phase electrical motor 105, the current sensor 110, and the current sense signal 111 are not illustrated. Each IGBT of the upper and lower arms of the IGBT module 104 is not illustrated either.

The inverter 300 illustrated in FIG. 4 includes an electrical motor control board 312 and a gate drive board 301 instead of the electrical motor control board 102 and the gate drive board 103 of the conventional inverter 101 illustrated in FIG. 1. The electrical motor control board 312 is different from the electrical motor control board 102 illustrated in FIG. 1 in that a 12 Vactive signal 303 indicating whether a 12 V power source 100 is normally supplied is output to the gate drive board 301 in addition to each of the above-described signals input and output by the electrical motor control board 102 and a 3 phase short controlling signal (3 PSactive signal) 305 indicating whether 3 phase short control to be described below is performed by the gate drive board 301 is input from the gate drive board 301. On the other hand, the gate drive board 301 is mainly different from the gate drive board 103 illustrated in FIG. 1 in that the gate drive board 301 includes a power source circuit 311 instead of the power source circuit 115 and includes a microcomputer 302 and a high-voltage dividing circuit 306.

The power source circuit 311 is connected between a positive wiring 112 and a negative wiring 113. Thus, the power source circuit 311 is different from the power source circuit 115 illustrated in FIG. 1 in that a power source is generated based on DC power supplied from a high-voltage power source 106 rather than the power source voltage 116 output from the electrical motor control board 312, and supplies the power source to six gate drive circuits 201 and the microcomputer 302. As will be described below, when connection between the inverter 300 and the high-voltage power source 106 is cut off by opening a contactor 107, a voltage according to an amount of charge accumulated in a smoothing capacitor 109 is applied between the positive wiring 112 and the negative wiring 113. At this time, the power source circuit 311 generates a power source based on DC power supplied from the smoothing capacitor 109 instead of the high-voltage power source 106 and supplies the power source to the gate drive circuit 201 and the microcomputer 302.

The high-voltage dividing circuit 306 divides the voltage of the positive wiring 112 into voltages measurable by the microcomputer 302 and outputs the voltages to the microcomputer 302. The microcomputer 302 measure the voltage between the positive wiring 112 and the negative wiring 113, that is, the voltage of the positive wiring 112 with respect to the reference potential by measuring an output voltage of the high-voltage dividing circuit 306. Thus, by measuring the voltage of the positive wiring 112 with respect to the reference potential, the microcomputer 302 can measure the voltage of the high-voltage power source 106, when the contactor 107 is turned on, and can measure the voltage of the smoothing capacitor 109, when the contactor 107 is turned off.

The microcomputer 302 inputs the 12 Vactive signal 303 output from the electrical motor control board 312 via the coupler 304 and determines whether the control power source supplied from the 12 V power source 100 to the electrical motor control board 312 normally functions based on the 12 Vactive signal 303. When it is determined that the control power source does not normally function, the microcomputer 302 outputs a 3-phase short signal 307 to control of the switching of each IGBT of the lower arm. After the 3-phase short signal 307 is divided into three signals, the divided signals are output to three driver circuits 121 corresponding to the lower arm via three couplers 314 and three 2-input AND circuits 313, respectively. Thus, the gate drive board 301 is configured such that the same 3-phase short signal 307 can be output from the microcomputer 302 to all of the driver circuits 121 of the lower arm of the 3 phases. That is, all of the IGBTs of the lower arm of the 3 phases can simultaneously be turned on or off. At this time, the microcomputer 302 outputs the 3 PSactive signal 305 to the electrical motor control board 312 via the coupler 308 to notify the electrical motor control board 312 that the 3-phase short control is being performed.

(Power Source Circuit)

Figure 5:
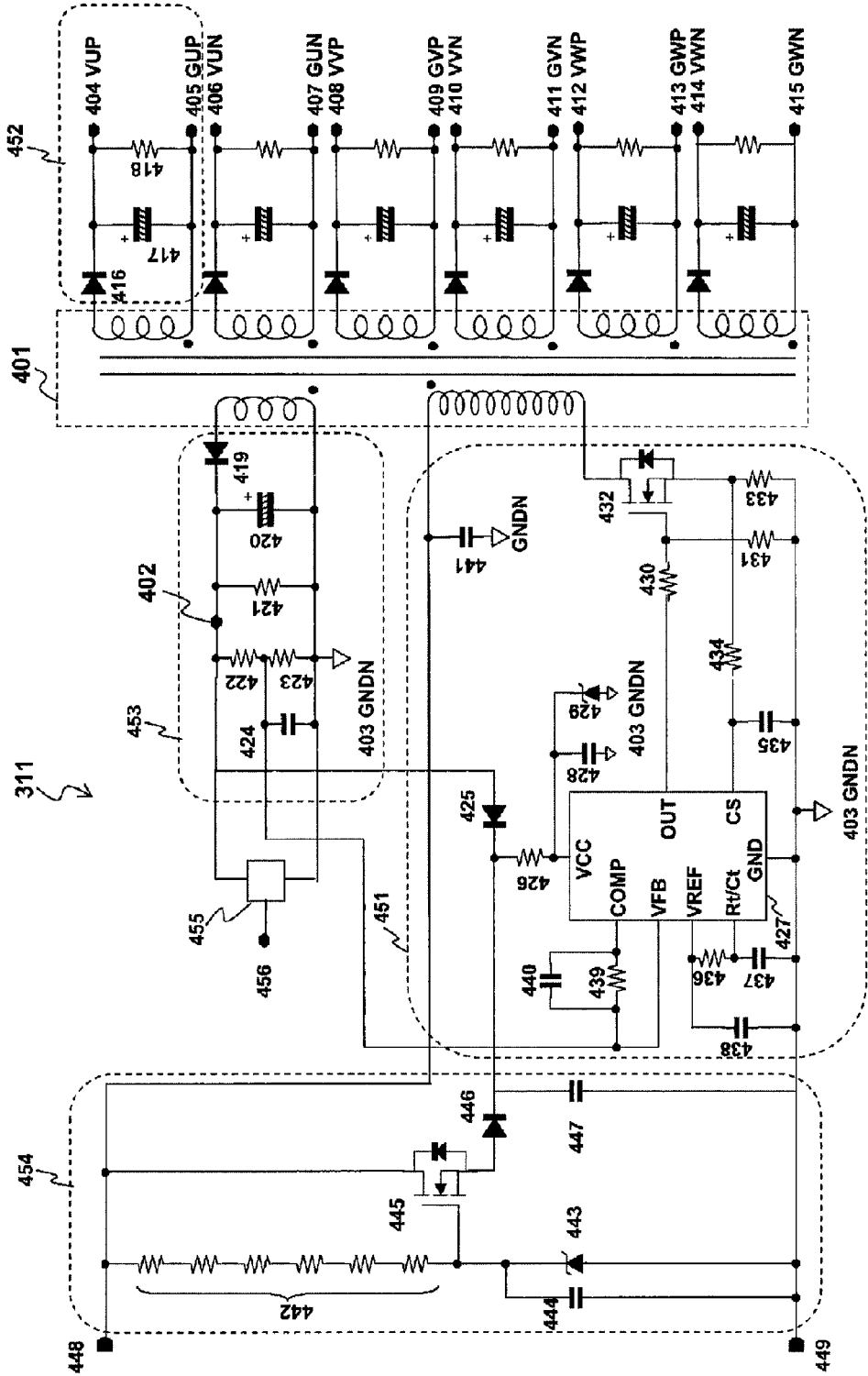
FIG. 5 is a circuit diagram illustrating an example of a gate driving power source circuit of the power inverter according to the first embodiment of the invention.

FIG. 5 is a circuit diagram illustrating an example of the power source circuit 311 which is a gate driving power source circuit of the power inverter according to the first embodiment of the invention. As illustrated in FIG. 5, the power source circuit 311 includes a transformer 401, a transformer primary side circuit 451, a transformer secondary side circuit 452, a feedback circuit 453, a startup circuit 454, and a 5 V power source 455. A positive input terminal 448 and a negative input terminal 449 are connected to the high-voltage power source 106 and the smoothing capacitor 109 via the positive wiring 112 and the negative wiring 113. A total of six transformer secondary side circuits 452 are present, since the transformer secondary side circuits 452 are installed for the upper and lower arms of the U, V, and W phases. In FIG. 5, the transformer secondary side circuit 452 corresponding to the upper arm of the U phase is indicated by a dotted line. In FIG. 5, an example of the circuit diagram of the power source circuit 311 operating in a flyback system is illustrated.

(Transformer Primary Side Circuit)

The transformer primary side circuit 451 controls a primary-side current of the transformer 401 so that the voltage output of the feedback circuit 453 becomes 15 V. Each transformer secondary side circuit 452 rectifies the secondary-side current of the transformer 401 and outputs a DC voltage to the corresponding driver circuit 121. The feedback circuit 453 is a dummy circuit of the transformer secondary side circuit 452 and outputs a feedback signal to the transformer primary side circuit 451 by outputting the same DC voltage. The feedback circuit 453 also serves as a power source of the transformer primary side circuit 451. The startup circuit 454 is a circuit that serves as a power source of the transformer primary side circuit 451, until the voltage of the feedback circuit 453 is output when the power source circuit 311 is activated. The 5 V power source 455 includes a 5 V output 456 for a microcomputer power source and outputs a power source to the microcomputer 302 illustrated in FIG. 4 from the 5 V output 456 based on the output of the feedback circuit 453. The 5 V power source 455 includes a watch dog timer for the microcomputer and a mechanism that performs resetting when the microcomputer 302 is excessively driven.

The transformer primary side circuit 451 includes a first power source conversion diode 425, a PWMIC power source resistor 426, a PWMIC 427, an IC bypass capacitor 428, an IC power source zener diode 429, a gate resistor 430, an FET pull-down resistor 431, a transformer driving FET 432, a transformer current measurement resistor 433, a filter resistor 434, a filter capacitor 435, an oscillation resistor 436, an oscillation capacitor 437, a VREF bypass capacitor 438, an error amplifier resistor 439, an error amplifier capacitor 440, and a transformer bypass capacitor 441.

When the output voltage of the feedback circuit 453 is higher than the output voltage of the startup circuit 454, the first power source conversion diode 425 is turned on and switches the power source from the output of the feedback circuit 453 to the output of the startup circuit 454. The PWMIC power source resistor 426 performs control such that power source current of the PWMIC 427 does not excessively flow. The PWMIC 427 performs PWM control on the transformer driving FET 432 by monitoring the output of the feedback circuit 453 and a primary side current of the transformer 401. The IC bypass capacitor 428 and the IC power source zener diode 429 stabilize the power source of the PWMIC 427. The gate resistor 430 performs the control such that the output current of the PWMIC 427 does not excessively flow. When an output becomes a high-impedance (disconnection) state due to breakdown or the like of the PWMIC 427, the FET pull-down resistor 431 drops the input of the transformer driving FET 432 to GNDN 403 which is the reference potential of the gate drive board 301 to prevent the circuit from becoming unstable. The transformer driving FET 432 sends a current to the primary side of the transformer 401 according to a PWM pulse output from the PWMIC 427. The transformer current measurement resistor 433 converts the primary side current of the transformer 401 into a voltage. The filter resistor 434 and the filter capacitor 435 which are filters remove noise riding on the voltage of the transformer current measurement resistor 433 and transmit the voltage to the PWMIC 427. The oscillation resistor 436, the oscillation capacitor 437, and the VREF bypass capacitor 438 are components externally attached on an oscillation circuit included in the PWMIC 427 and set an oscillation frequency of the PWM pulse. The error amplifier resistor 439 and the error amplifier capacitor 440 are components externally attached to an amplifier included in the PWMIC 427 and amplify the feedback signal from the feedback circuit 453 to set an amplification ratio at the time of obtaining the feedback signal to the PWMIC 427. The transformer bypass capacitor 441 is a bypass capacitor for the primary side current of the transformer 401.

(Transformer Secondary Side Circuit)

Each transformer secondary side circuit 452 includes a rectifying diode 416, a smoothing capacitor 417, and a breeder resistor 418 and also includes an output terminal outputting a DC voltage to the corresponding driver circuit 121 and a reference terminal. For example, the transformer secondary side circuit 452 corresponding to the upper arm of the U phase includes an insulated power source output terminal (VUP) 404 and an insulated power source reference terminal (GUP) 405, and thus is connected to the driver circuit 121 driving the IGBT of the upper arm of the U phase by the insulated power source output terminal 404 and the insulated power source reference terminal 405. Likewise, the transformer secondary side circuit 452 corresponding to the lower arm of the U phase includes an insulated power source output terminal (VUN) 406 and an insulated power source reference terminal (GUN) 407. The transformer secondary side circuit 452 corresponding to the upper arm of the V phase includes an insulated power source output terminal (VVP) 408 and an insulated power source reference terminal (GVP) 409. The transformer secondary side circuit 452 corresponding to the lower arm of the V phase includes an insulated power source output terminal (VVN) 410 and an insulated power source reference terminal (GVN) 411. The transformer secondary side circuit 452 corresponding to the upper arm of the W phase includes an insulated power source output terminal (VWP) 412 and an insulated power source reference terminal (GWP) 413. The transformer secondary side circuit 452 corresponding to the lower arm of the W phase includes an insulated power source output terminal (VWN) 414 and an insulated power source reference terminal (GWN) 415. Each transformer secondary side circuit 452 is connected to the corresponding driver circuit 121 by these terminals.

The rectifying diode 416 passes only a current of a one-side direction of the secondary side current of the transformer 401 and charges the smoothing capacitor 417. The smoothing capacitor 417 is charged with the current flowing in the rectifying diode 416 and generates an output voltage between the above-described output and reference terminals such as the insulated power source output terminal (VUP) 404 and the insulated power source reference terminal (GUP) 405 corresponding to the upper arm of the U phase. The breeder resistor 418 is a dummy load that has a small resistant value and is installed to stabilize the output voltage without intermittent output of the PWM pulse even when the load of the power source circuit 311 is zero.

(Feedback Circuit)

The feedback circuit 453 includes a rectifying diode 419, a smoothing capacitor 420, a breeder resistor 421, voltage dividing resistors 422 and 423, and a bypass capacitor 424.

The rectifying diode 419, the smoothing capacitor 420, and the breeder resistor 421 perform the same operations as those of the rectifying diode 416, the smoothing capacitor 417, and the breeder resistor 418 of the transformer secondary side circuit 452, as described above. The voltage dividing resistors 422 and 423 divide an output voltage VFB 402 of the feedback circuit 453 and generate a feedback signal. A voltage dividing ratio is set such that the divided voltage, that is the feedback signal voltage, is identical with the voltage reference value of the PWMIC 427, when the output voltage of the feedback circuit 453 becomes 15 V of a target voltage.

(Startup Circuit)

The startup circuit 454 includes a voltage drop resistor 442, a zener diode 443, a stabilizing capacitor 444, a high-voltage FET 445, a second conversion diode 446, and an output stabilizing capacitor 447 and is connected to the positive wiring 112 and the negative wiring 113 by a positive input terminal 448 and a negative input terminal 449. Thus, as described above, the positive input terminal 448 and the negative input terminal 449 are connected to the high-voltage power source 106 and the smoothing capacitor 109 via the positive wiring 112 and the negative wiring 113.

The voltage drop resistor 442 and the zener diode 443 provide a zener voltage to the gate of the high-voltage FET 445. The zener voltage is about 10 V and is a voltage lower than the output voltage of the feedback circuit 453. The stabilizing capacitor 444 stabilizes the zener voltage. The high-voltage FET 445 supplies the power source voltage from the positive input terminal 448 to the transformer primary side circuit 451. The high-voltage FET 445 is turned on, when the power source voltage of the transformer primary side circuit 451 is lower than a predetermined value (referred to as Vstartup) obtained by subtracting the gate threshold value voltage of the high-voltage FET 445 and a forward direction voltage of the second conversion diode 446 from the zener voltage. The high-voltage FET 445 is turned off, when the power source voltage is greater than the predetermined value. Thus, the power source voltage of the transformer primary side circuit 451 is stabilized to the Vstartup. When the power source voltage of the transformer primary side circuit 451 is greater than the Vstartup, the second conversion diode 446 is turned off and blocks the supply of the power source from the startup circuit 454 to the transformer primary side circuit 451.

The output stabilizing capacitor 447 is a capacitor that stabilizes the power source voltage of the transformer primary side circuit 451.

(AND Circuit)

Figure 6:
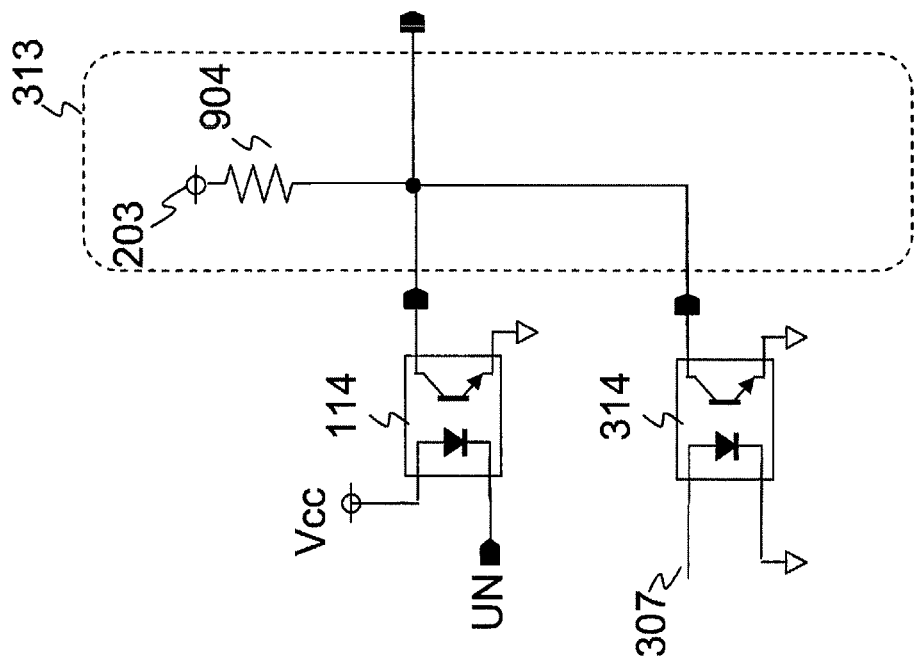
FIG. 6 is a circuit diagram illustrating an example of an AND circuit of the power inverter according to the first embodiment of the invention.

FIG. 6 is a circuit diagram illustrating an example of the 2-input AND circuit 313 to which the 3-phase short signal 307 output from the microcomputer 302 is input via the coupler 314. In FIG. 6, the AND circuit 313 corresponding to the lower arm of the U phase is exemplified among the three AND circuits 313. As illustrated in FIG. 6, a collector output of the coupler 114 to which the gate control signal UN of the lower arm of the U phase is input and one collector output among the three couplers 314 are connected commonly to the input side of the AND circuit 313. The AND circuit 313 is configured such that the collector output is pulled up to the power source 203 of FIG. 2, that is, the signal level of the corresponding driver circuit 121 via a resistor 904. That is, the output of the AND circuit 313 is open collector outputs of the couplers 114 and 314. Thus, the wired OR circuit in negative logic, that is, the AND circuit 313 in positive logic is configured. Further, the same also applies to the AND circuits 313 corresponding to the lower arm of the other V and W phases.

(Operation when Control Power Source is Lost)

Figure 7:
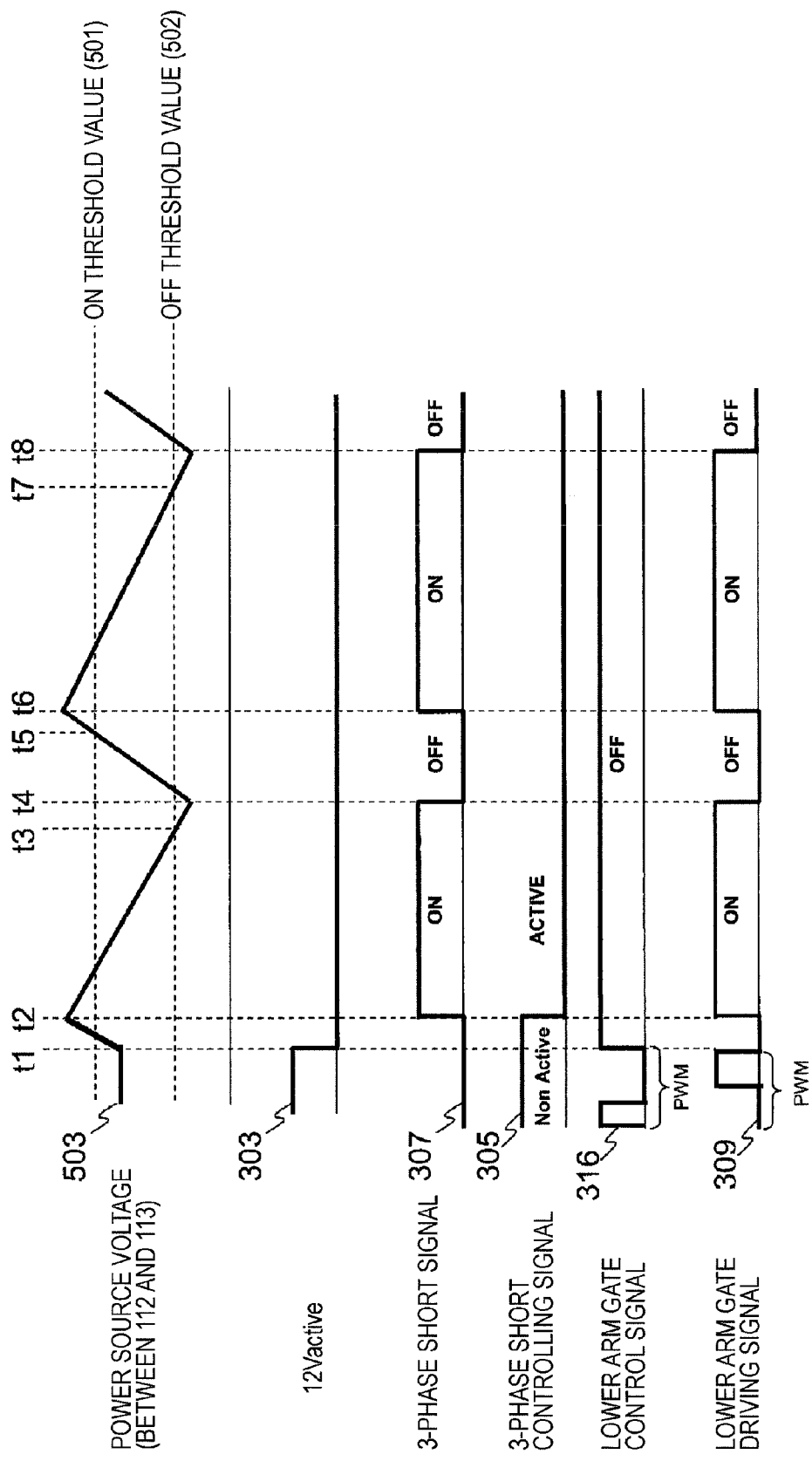
FIG. 7 is a diagram illustrating examples of timing charts when a control power source is broken down.

FIG. 7 is a diagram illustrating examples of timing charts when the control power source in the inverter 300 is broken down. In FIG. 7, a timing chart denoted by reference numeral 503 indicates a change form of a power source voltage supplied between the positive wiring 112 and the negative wiring 113. The microcomputer 302 measures the power source voltage 503 by measuring the voltage of the positive wiring 112 divided by the high-voltage dividing circuit 306, as described above. Timing charts indicating change forms of the 12 Vactive signal 303, the 3-phase short signal 307, and the 3-phase short controlling signal (3 PSactive signal) 305 described above are illustrated below the timing chart of the power source voltage. Below these timing charts, a timing chart indicating a change form of a gate control signal UN of the lower arm of the U phase denoted by reference numeral 315 of FIG. 4 is illustrated as a representative of the gate control signals 108N of the lower arm output for the respective phases of the U, V, and W phases from the electrical motor control board 312, and a timing chart indicating a change form of the gate driving signal 309 of the lower arm of the U phase output from the corresponding driver circuit 121 is illustrated.

For example, when the 12 V power source 100 supplying power as the control power source to the electrical motor control board 312 is broken down at time t1, the contactor 107 of the high-order control device (not illustrated) of a vehicle is turned off so that an open state is entered. Thus, the connection between the inverter 300 and the high-voltage power source 106 is cut off, and thus the supply of the power from the high-voltage power source 106 to the power source circuit 311 is blocked. At this time, the power source voltage 503 between the positive wiring 112 and the negative wiring 113 is determined according to an amount of charge, that is, an amount of charge accumulated in the smoothing capacitor 109. At this time, the power source circuit 311 generates the power source using the DC power supplied from the smoothing capacitor 109 and supplies the power source to each gate drive circuit 201 and the microcomputer 302. On the other hand, the function of the electrical motor control board 312 is lost, since the control power source is not supplied from the 12 V power source 100. For this reason, a current do not flow to the primary-side diode of the coupler and the gate control signals of the upper and lower arms of the respective phases output from the electrical motor control board 312 to the gate drive board 301 become an 'H' level indicating OFF of all the IGBTs, as in the gate control signal UN 316 of the lower arm of the U phase. Thus, all of the gate driving signals output from the respective driver circuits 121 become an 'L' level, as in the gate driving signal 309 of the lower arm of the U phase. As a result, all of the IGBTs of the upper and lower arms of 3 phases in the IGBT module 104 are turned off.

When the control power source is abnormal, as described above, the 12Vactive signal 303 is changed from the 'H' level to the 'L' level at time t1, and thus the electrical motor control board 312 notifies the gate drive board 301 that the control power source is abnormal. Then, based on the change in the 12Vactive signal 303, the microcomputer 302 determines that the 12 V power source 100 is not normal and the control power source is not properly supplied to the electrical motor control board 312. The 3 PSactive signal 305 is changed from 'H' to 'L' at time t2 after elapse of a predetermined delay time. Thus, the electrical motor control board 312 is notified that the 3-phase short control is performed and the microcomputer 302 starts outputting the 3-phase short signal 307 to each driver circuit 121 of the lower arm. Here, the 3 PSactive signal 305 is a negative logic signal. 'H' indicates that the 3-phase short control is not performed and 'L' indicates that the 3-phase short control is performed.

Immediately after the 3-phase short control is started at time t2, the power source voltage 503 supplied between the positive wiring 112 and the negative wiring 113, that is, the voltage of the smoothing capacitor 109, is greater than a predetermined ON threshold value 501. At this time, the microcomputer 302 changes the 3-phase short signal 307 from 'L' to 'H.' Then, according to the change in the 3-phase short signal 307, all of the gate driving signals output from the respective driver circuits 121 of the lower arm thus become the 'H' level, as in the gate driving signal 309 of the lower arm of the U phase, and all of the IGBTs of the lower arm of the 3 phases in the IGBT module 104 are turned on and enter a 3-phase short state. At this time, a regenerative current generated in the electrical motor 105 flows backward between the electrical motor 105 and the reference potential of the negative wiring 113, and thus the smoothing capacitor 109 is not charged. In the meantime, since the power is consumed in the power source circuit 311, the power source voltage 503 is gradually lowered after time t2. Here, the ON threshold value 501 is preferably set according to a resistance voltage or the like of the smoothing capacitor 109 or the IGBT.

Thereafter, when the power source voltage 503 continuously drops and is less than a predetermined OFF threshold value 502 at time t3, the microcomputer 302 changes the 3-phase short signal 307 from 'H' to 'L' at time t4 after elapse of a predetermined delay time. Then, all of the gate driving signals output from the respective driver circuits 121 of the lower arm accordingly become the 'L' level, as in the gate driving signal 309 of the lower arm of the U phase, all of the IGBTs of the lower arm of the 3 phases in the IGBT module 104 are turned off. Thus, all of the IGBTs of the upper and lower arms of the phases are turned off again. Thus, the drop of the power source voltage 503 is stopped, the power source voltage 503 can be prevented from being less than an active lower limit of the driver circuit 121. At this time, when the electrical motor 105 is rotated, the smoothing capacitor 109 is charged by outputting the regenerative current from the electrical motor 105 to the positive side of the smoothing capacitor 109 via the reflux diode of the upper arm, and the power source voltage 503 is raised after time t4. Here, the OFF threshold value 502 is preferably set as a high voltage by providing a margin from the lower limit of the voltage by which the gate drive circuit 201 can be active in consideration of a delay time or the like necessary for the microcomputer 302 to switch the 3-phase short signal 307.

Even when the 3-phase short state is entered and the power source voltage 503 is not less than the OFF threshold value 502 even after elapse of a given time, the microcomputer 302 preferably changes the 3-phase short signal 307 from 'H' to 'L', as described above. Thus, by not continuing the 3-phase short state for a time equal to or greater than the given time, the current can be prevented from flowing in the IGBT for a long time so that a heatproof temperature is not exceeded due to heat generation.

When the power source voltage 503 is continuously raised after time t4 and exceeds the ON threshold value 501 at time t5, the microcomputer 302 changes the 3-phase short signal 307 from 'L' to 'H' at time t6 after elapse of a predetermined delay time. Then, as in time t2, all of the gate driving signals output from the respective driver circuits 121 of the lower arm thus become the 'H' level, as in the gate driving signal 309 of the lower arm of the U phase, and all of the IGBTs of the lower arm of the 3 phases in the IGBT module 104 are turned on and enter a 3-phase short state. Thus, the increase in the power source voltage 503 is stopped again after time t6, and thus the power source voltage 503 can be prevented from exceeding the resistance voltage of the smoothing capacitor 109 or the IGBT.

When the power source voltage 503 is less than the OFF threshold value 502 at time t7, the microcomputer 302 changes the 3-phase short signal 307 from 'H' to 'L', as in time t4, to set all of the gate driving signals output from the respective driver circuits 121 of the lower arm to enter the 'L' level at time t8. Thus, by turning off all of the IGBTs of the upper and lower arms of the 3 phases, the power source voltage 503 can be prevented from being dropped. Thereafter, by performing the same 3-phase short control, the power source voltage 503 is controlled such that the power source voltage 503 falls within a range from the OFF threshold value 502 to the ON threshold value 501.

In the above-described operation when the control power source is lost, when the power source voltage 503 is less than the OFF threshold value 502 immediately after the start of the 3-phase short control, the 3-phase short signal 307 output from the microcomputer 302 is preferably maintained in the 'L' level until the power source voltage 503 exceeds the ON threshold value 501. Thus, by turning off all of the IGBTs of the upper and lower arms of the 3 phases and charging the smoothing capacitor 109 with the regenerative current from the electrical motor 105, the power source voltage 503 can be raised. Further, when the power source voltage 503 falls within the range from the OFF threshold value 502 to the ON threshold value 501 immediately after the start of the 3-phase short control, the 3-phase short signal 307 may be set to any one of the 'L' level and the 'H' level.

(Operation when Control Power Source is Recovered)

Figure 8:
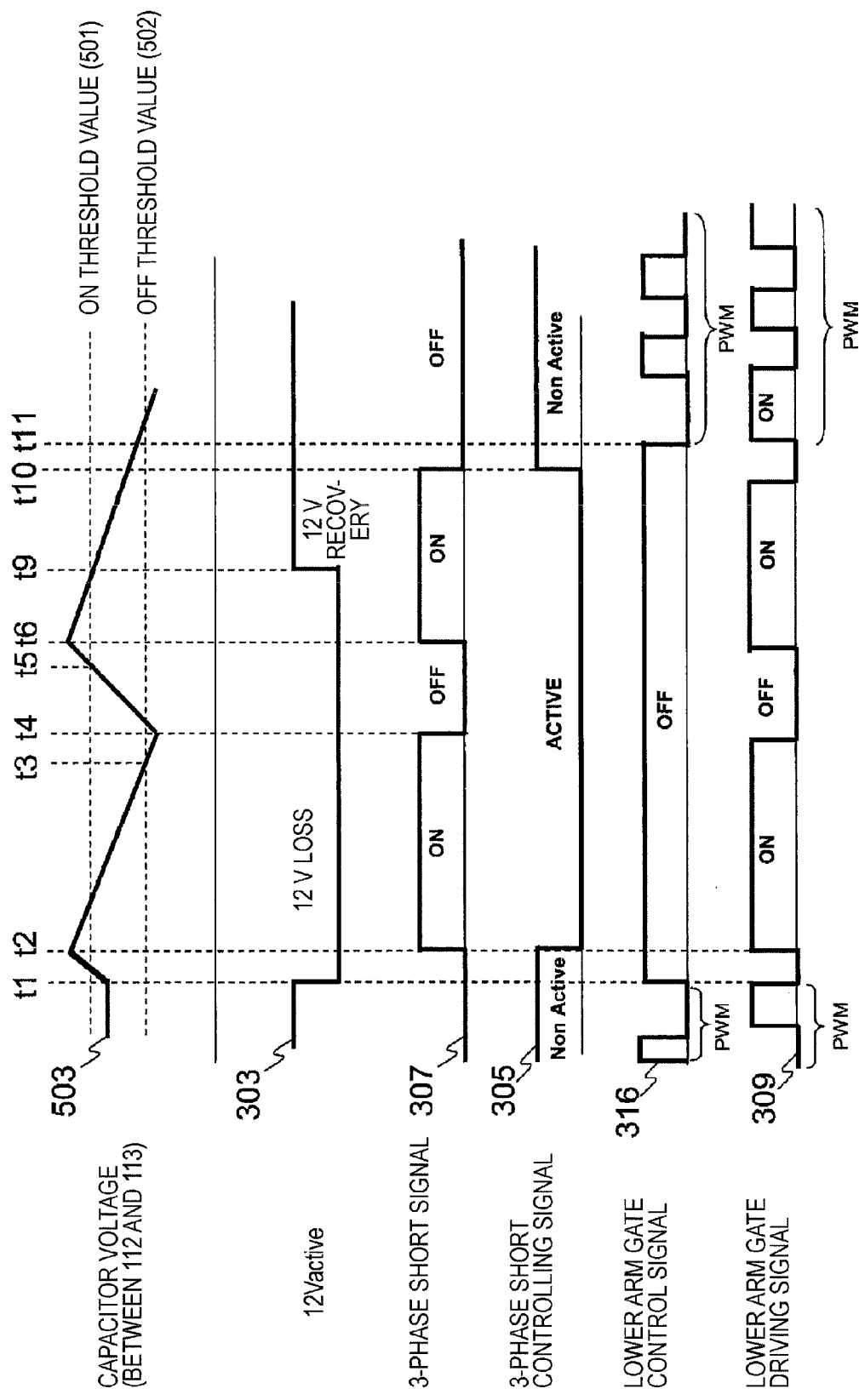
FIG. 8 is a diagram illustrating examples of timing charts when the control power source is recovered.

FIG. 8 is a diagram illustrating examples of timing charts when the control power source is recovered in the inverter 300. The timing charts illustrated in FIG. 8 indicate the same change forms of the signals as those of the timing charts illustrated in FIG. 7. The operation between time t1 to time t6 is the same as that in FIG. 7.

At time t9, the 12 V power source 100 is recovered from the breakdown and the supply of the control power source to the electrical motor control board 312 resumes, the 12 Vactive signal 303 is changed from the 'L' level to the 'H' level. Thus, the electrical motor control board 312 notifies the gate drive board 301 that the control power source is normal. Then, based on the change in the 12 Vactive signal 303, the microcomputer 302 determines that the 12 V power source 100 is normal and the control power source is properly supplied to the electrical motor control board 312. The 3-phase short signal 307 is changed to the 'L' level and the output is interrupted at time t10 after elapse of a predetermined delay time. Then, all of the gate driving signals output from the respective driver circuits 121 of the lower arm are accordingly changed to the 'L' level, and all of the IGBTs of the upper and lower arms of the 3 phases in the IGBT module 104 are turned off. At this time, the microcomputer 302 changes the 3 PSactive signal 305 from 'L' to 'H' at time t10. Thus, the 3-phase short control on the electrical motor control board 312 ends and the microcomputer 302' notifies the respective driver circuits 121 of the lower arm that the output of the 3-phase short signal 307 is interrupted.

As described above, when the 3 PSactive signal 305 from the microcomputer 302 is changed to 'H,' the electrical motor control board 312 accordingly resumes the output of the respective gate control signals of the upper and lower arms at time t11, as in the gate control signals UN 315 of the lower arm of the U phase. Thus, the gate driving signals output from the respective driver circuits 121 are changed according to the PWM control, as in the gate driving signal 309 of the lower arm of the U phase, and the operation returns to the normal electrical motor control.

Even when the electrical motor control board 312 resumes the supply of the control power source, the output of the gate control signals does not resume until change in the 3 PSactive signal 305 from the microcomputer 302 from 'L' to 'H.' Thus, the 3-phase short control by the microcomputer 302 and the PWM control by the electrical motor control board 312 can be prevented from overlapping, and thus an erroneous operation such as simultaneous turn-on of the IGBTs of the upper and lower arms can be avoided.

As described above, even when the control power source from the 12 V power source 100 is not supplied in the inverter 300, each driver circuit 121 is operated by the power supplied from the power source circuit 311 and the 3-phase short control of the IGBTs is performed, thereby preventing an overcurrent caused due to the regenerative voltage of the electrical motor 105. That is, when the power source voltage 503 nearly approaches the overcurrent due to the regenerative voltage of the electrical motor 105, all of the IGBTs of the lower arm of the 3 phases are turned on and the 3-phase short state in which the upper arm is turned off is set. Then, since the electrical motor current flows back between the electrical motor 105 and the reference potential of the power source voltage 503 via the IGBTs of the lower arm and the smoothing capacitor 109 is not charged, the increase in the power source voltage 503 is stopped and the power source voltage 503 is gradually lowered, thereby preventing an overvoltage.

Thereafter, when the power source voltage 503 is continuously lowered and the voltage of the power supplied from the power source circuit 311 to the driver circuit 121 approximates the active limit voltage of the driver circuit 121, all of the IGBTs of the upper and lower arms of the 3 phases are turned off. Then, by sending the electrical motor current again via the reflux diode, the smoothing capacitor 109 is charged and the power source voltage 503 is raised. Thus, the activation of the driver circuit 121 can be prevented from being interrupted due to lowering of the voltage of the power source supplied from the power source circuit 311 to the driver circuit 121 is lowered. When the activation of the driver circuit 121 is interrupted, all of the IGBTs of the upper and lower arms of the 3 phases remain in the OFF state, and thus the overvoltage may not be suppressed as the 3-phase short state. Therefore, the inverter 300 may be broken down in some cases. Further, even when the driver circuit 121 is re-activated with re-increase in the power source voltage 503, there is a possibility that it is late until the breakdown of the inverter 300 since it takes some time to reactivate the driver circuit 121. Accordingly, as described above, the driver circuits 121 remain to be active by turning off all of the IGBTs of the upper and lower arms of the 3 phases before the power source voltage 503 becomes the active limit voltage of the driver circuit 121. Therefore, the overvoltage can be prevented even when the power source voltage 503 is raised again due to the regenerative voltage.

According to the first embodiment described above, the following operational advantageous effects can be obtained.

(1) The inverter 300 includes a plurality of IGBTs that convert DC power supplied from the high-voltage power source 106 into the AC power configured to drive the 3-phase electrical motor 105, an electrical motor control board 312 to which the power is supplied from the 12 V power source 100 and which outputs the gate control signal configured to control the operation of the IGBT, the smoothing capacitor 109 that is charged based on the AC power generated by the electrical motor 105 to store the DC power, the power source circuit 311 that supplies the power based on the DC power supplied from the high-voltage power source 106 or the smoothing capacitor 109, the driver circuit 121 to which the power is supplied from the power source circuit 311 and which outputs the gate driving signal configured to operate the IGBT based on the gate control signal from the electrical motor control board 312 or the 3-phase short signal 307 from the microcomputer 302, and the microcomputer 302. When the 12 V power source 100 is broken down and the contactor 107 is turned off, the microcomputer 302 measures the voltage of the smoothing capacitor 109 as the power source voltage 503. When the power is supplied from the power source circuit 311, the microcomputer 302 determines whether the 12 V power source 100 is normal. When it is determined that the 12 V power source 100 is not normal, the 3-phase short signal 307 configured to control the operation of the IGBT is output based on the measured power source voltage 503. Specifically, when the power source voltage 503 is greater than the predetermined ON threshold value 501, the microcomputer 302 outputs the 3-phase short signal 307 with the 'H' level so that all of the IGBTs of the lower arm are turned on and all of the IGBTs of the upper arm of the other side are turned off. Thus, even when the overvoltage occurs in the state in which the 12 V power source 100 which is the controlling power source circuit does not normally operates, the overvoltage can be suppressed.

(2) When the power source voltage 503 is equal to or less than the predetermined OFF threshold value 502 less than the ON threshold value 501, the microcomputer 302 outputs the 3-phase short signal 307 with the 'L' level so that all of the IGBTs of the upper arm and the IGBTs of the lower arm are turned off. Thus, the activation of the driver circuit 121 can be prevented from being stopped due to the lowering of the power source voltage 503, and thus the overvoltage can be suppressed even when the power source voltage 503 is raised again.

(3) When the microcomputer 302 controls the 3-phase short signal 307 and determines that the 12 V power source 100 is normal, the microcomputer 302 stops the control of the 3-phase short signal 307. Thus, the output of the gate control signal from the electrical motor control board 312 can resume and the operation returns to the normal control on the electrical motor.

(4) The 3-phase short controlling signal (3 PSactive signal) 305 indicating whether the microcomputer 302 outputs the 3-phase short signal 307 is output from the microcomputer 302 to the electrical motor control board 312. Thus, whether the microcomputer 302 controls the 3-phase short signal 307 can be easily determined in the electrical motor control board 312.

(5) The electrical motor control board 312 does not output the gate control signal, when the microcomputer 302 outputs the 3 PSactive signal 305 with the 'L' level indicating that the microcomputer 302 controls the 3-phase short signal 307. Thus, by simultaneously outputting the 3-phase short signal 307 from the microcomputer 302 and the gate control signal from the electrical motor control board 312, it is possible to prevent the IGBT from being erroneously operated.

(6) A circuit that measures the voltage of the smoothing capacitor 109 as the power source voltage 503 is realized using the microcomputer 302 operated by the power supplied from the power source circuit 311. Thus, even when the 12 V power source 100 is not normal, the voltage of the smoothing capacitor 109 can be measured and the 3-phase short signal 307 can be output.

(Second Embodiment)

Next, a power inverter according to a second embodiment of the invention will be described below with reference to FIGS. 9 to 13.

(Configuration of Inverter)

Figure 9:
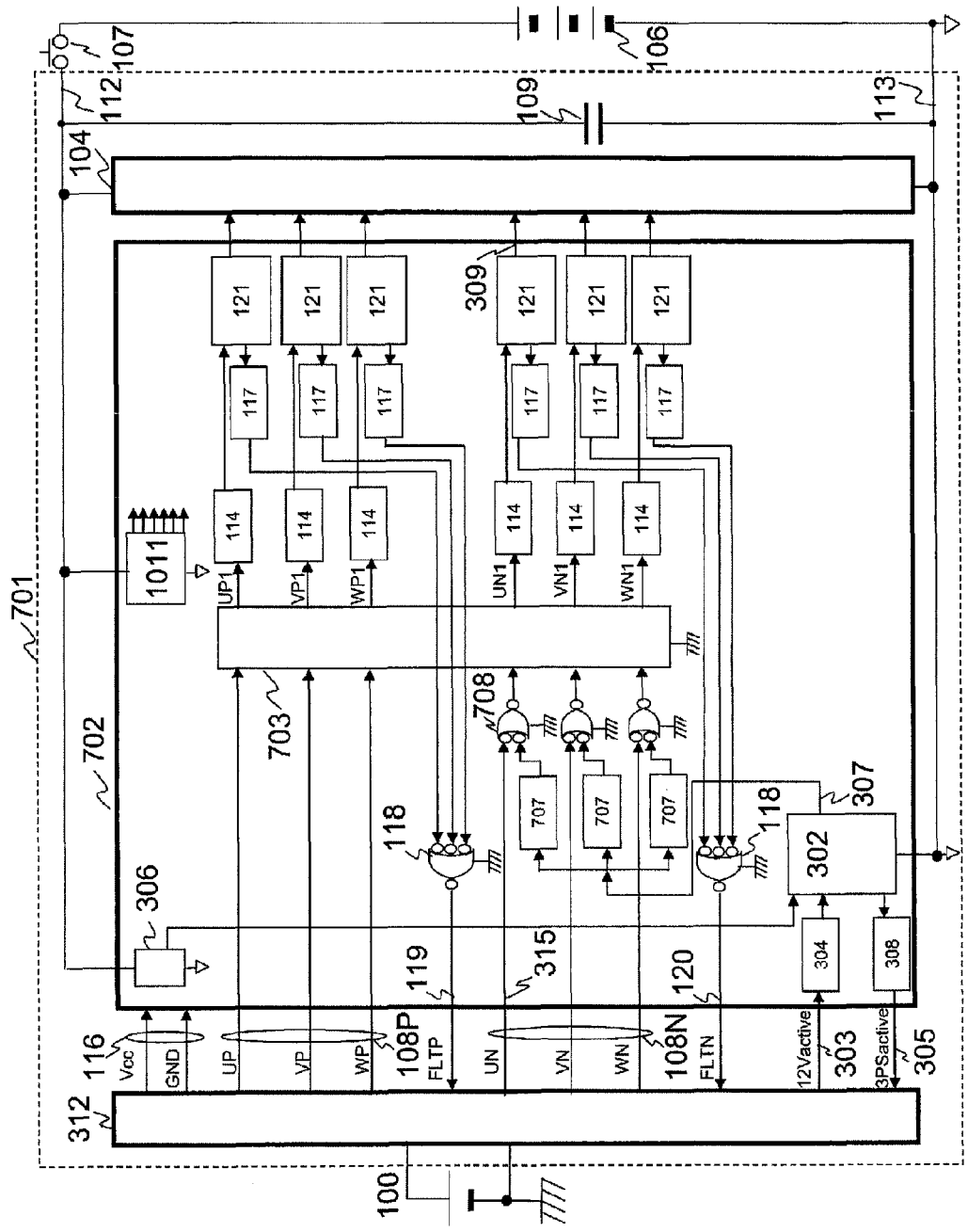
FIG. 9 is a block diagram illustrating an example of an electrical circuit configuration of a power inverter according to a second embodiment of the invention.

FIG. 9 is a block diagram illustrating an example of an electrical circuit configuration of an inverter 701 which is a power inverter according to a second embodiment of the invention. As in FIG. 4 described, in FIG. 9, the same reference numerals are also given to units common to those of the conventional inverter 101 illustrated in FIG. 1. The 3-phase electrical motor 105, the current sensor 110, and the current sense signal 111 are not illustrated. Each IGBT of the upper and lower arms of the IGBT module 104 is not illustrated either.

The inverter 701 illustrated in FIG. 9 includes a gate drive board 702 instead of the gate drive board 301, compared to the inverter 300 illustrated in FIG. 4 in the first embodiment. The gate drive board 702 further includes a simultaneous ON prevention circuit 703 in addition to each configuration of the gate drive board 301. Further, a power source circuit 1011 is included instead of the power source circuit 311, and three couplers 707 and three AND circuits 708 are included instead of the three couplers 314 and the three AND circuits 313. This configuration is also different from that of the gate drive board 301 illustrated in FIG. 4.

Each gate control signal output from the electrical motor control board 312 is input to the simultaneous ON prevention circuit 703 in the gate drive board 702. At this time, the gate control signal 108P of the upper arm is input directly to the simultaneous ON prevention circuit 703 and the gate control signal 108N of the lower arm is input to the simultaneous ON prevention circuit 703 via the AND circuit 708.

The simultaneous ON prevention circuit 703 prevents a turn-on instruction of a pair of the gate control signals corresponding to the upper and lower arms of the same phase from being simultaneously given for the pair of the gate control signals corresponding to the upper and lower arms of the same phase among the input gate controls signals. Specifically, when both the pair of the gate control signals of the upper and lower arms of the same phase have the 'L' level, that is, the turn-on instruction of any one thereof is given, both the signals are changed to the 'H' level and a turn-off instruction is output to prevent the short-circuiting of the upper and lower arms of the IGBTs.

Figure 10:
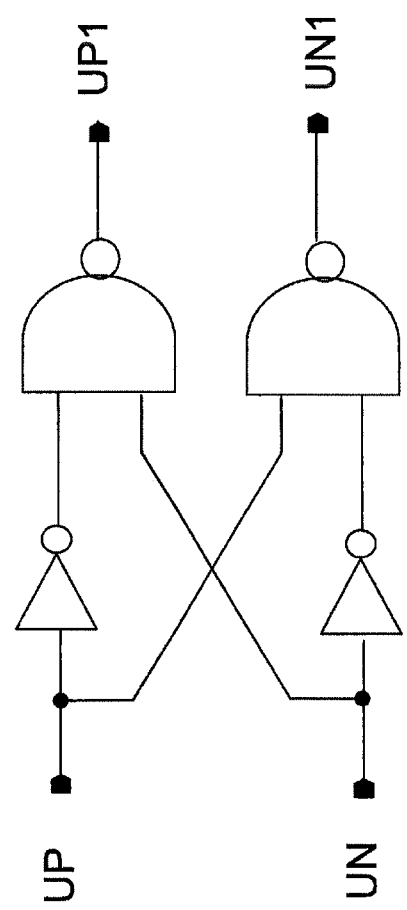
FIG. 10 is a logic circuit diagram illustrating an example of a simultaneous ON prevention circuit.

FIG. 10 is a logic circuit diagram illustrating an example of the simultaneous ON prevention circuit 703. Here, the logic circuit diagram corresponding to one pair of the upper and lower arms of the U phase is illustrated. The circuit illustrated in FIG. 10 includes two inverter gates and two NAND circuits. A gate control signal UP of the upper arm of the U phase and a gate control signal UN of the lower arm of the U phase are input to the two inverter gates, respectively, and signals UP1 and UN1 are output from the two NAND circuits.

Figure 11:
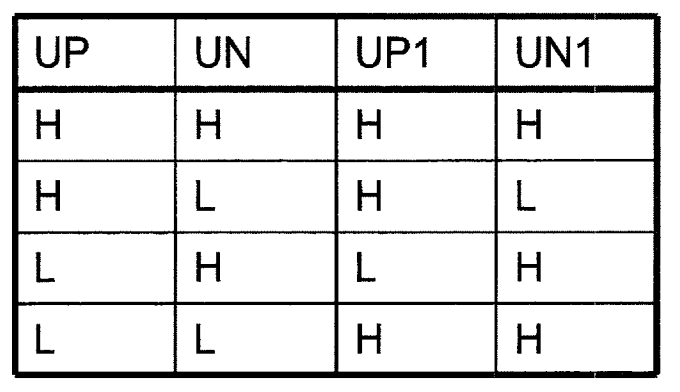

FIG. 11 illustrates a true value table of input and output of the simultaneous ON prevention circuit 703 illustrated in FIG. 10. As illustrated in the true value table, when both the input gate control signals UP and UN have the 'L' level, the output signals UP1 and UN1 with the 'H' level inverted from the gate control signals UP and UN are output from the simultaneous ON prevention circuit 703. In other cases, the input gate control signals UP and UN are the same as the output signals UP1 and UN1, respectively. Thus, even when the gate control signals simultaneously turning on the IGBTs of the upper and lower arms of the same phase are erroneously output from the electrical motor control board 312, the IGBT can be prevented from being simultaneously turned on in the upper and lower arms by simultaneously outputting the signals inverted from the gate control signals from the simultaneous ON prevention circuit 703.

The 3-phase short signal 307 output from the microcomputer 302 is divided into three signals, and then the divided signals are input to the three couplers 707, respectively. Each coupler 707 changes the reference potential of the input 3-phase short signal 307 from the reference potential of the gate drive board 702 to the reference potential of the electrical motor control board 312, and then outputs the 3-phase short signal to the corresponding AND circuit 708 among the three AND circuits 708. Each AND circuit 708 takes negative logic OR between the 3-phase short signal 307 input from the coupler 707 and the gate control signal of the lower arm input from the electrical motor control board 312. The logic calculation result is output as the gate control signal of the lower arm to the simultaneous ON prevention circuit 703.

The power source circuit 1011 supplies the power source to the six gate drive circuits 201 and the microcomputer 302, as in the power source circuit 311 according to the first embodiment. Additionally, the power source circuit 1011 has a function of outputting the power source used to convert the reference potential of the 3-phase short signal 307 in the coupler 707.

Figure 12:
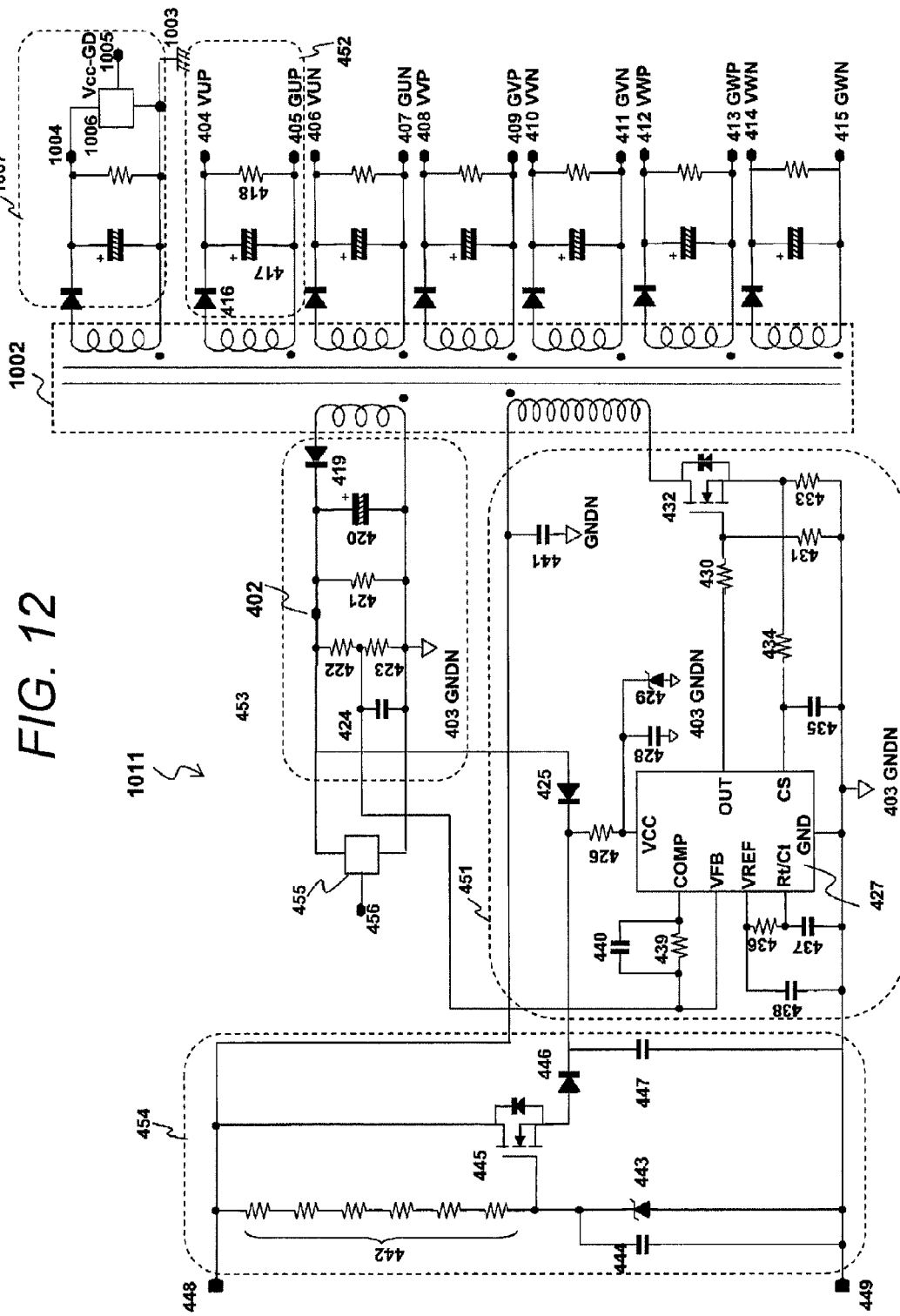
FIG. 12 is a circuit diagram illustrating a gate driving power source circuit of the power inverter according to the second embodiment of the invention.

FIG. 12 is a circuit diagram illustrating an example of the power source circuit 1011 as the gate driving power source circuit of the power inverter according to the second embodiment of the invention. Compared to the power source circuit 311 illustrated in FIG. 5 in the first embodiment, the power source circuit 1011 in FIG. 12 further includes one output phase 1007 in addition to six transformer secondary side circuits 452 on the secondary side of the transformer 1002. The output phase 1007 outputs a 15 V power source voltage, as in each transformer secondary side circuit 452, but a reference potential 1003 is a reference potential of the electrical motor control board 312. Further, the output phase 1007 includes a 5 V power source 1006, and a 5V output Vcc-GD denoted by reference numeral 1005 is output from the 5 V power source 1006.

Figure 13:
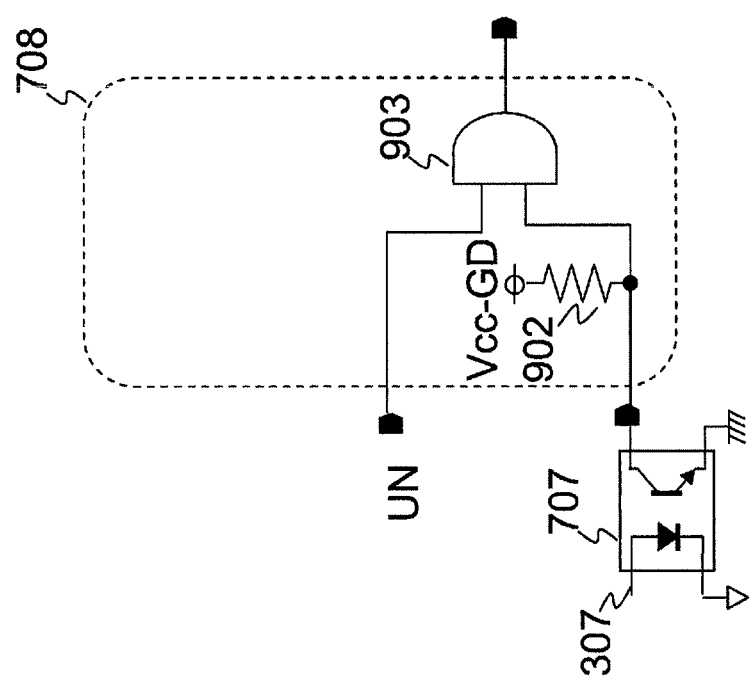
FIG. 13 is a circuit diagram illustrating an example of an AND circuit of the power inverter according to the second embodiment of the invention.

FIG. 13 is a circuit diagram illustrating an example the 2-input AND circuit 708 to which the 3-phase short signal 307 output from the microcomputer 302 is input via the coupler 707. FIG. 13 exemplifies the AND circuit 708 corresponding to the lower arm of the U phase among the three AND circuits 708. As illustrated in FIG. 13, one input of an AND logic circuit 903 is a gate control signal UN of the lower arm of the U phase and the other input thereof is one collector output among the three couplers 707. The collector output of the coupler 707 is pulled up to the 5 V output Vcc-GD denoted by reference numeral 1005 in FIG. 12 via a resistor 902. The reference potential of the output side of the coupler 707 is the same as the reference potential of the electrical motor control board 312. Further, the same also applies to the AND circuits 708 corresponding to the lower arms of the other V and W phases.

According to the second embodiment described above, the same operational advantages effects as those of the first embodiment can be obtained.

In each embodiment described above, all of the IGBTs of the lower arm of the 3 phases have been turned on and all of the IGBTs of the upper arm of the 3 phases have been turned off by performing the 3-phase short control, but the upper and lower arms may be switched. That is, the 3-phase short control may be performed by turning on all of the IGBTs of the upper arm of the 3 phases and turning off all of the IGBTs of the lower arm of the 3 phases. In this case, the electrical circuit configuration exemplified in FIG. 4 or 9 is of course modified suitably.

In each embodiment described above, the power inverter mounted on a vehicle has been described as an example, but the application range of the present invention is not limited thereto and may be applied to power inverters for various purposes. The above descriptions are merely examples and the invention is not limited to the configurations of the above-described embodiments.

The present specification is based on Japanese Patent Application No. 2011-46167 (filed on Mar. 3, 2011). Priority is claimed on Japanese Patent Application No. 2011-46167, the content of which is incorporated herein by reference.

The invention claimed is:

1. A power inverter comprising:
a plurality of power conversion elements that convert DC power supplied from a first DC power source into AC power used to drive an electrical motor;
a first control circuit to which power is supplied from a second DC power source and which outputs a first control signal configured to control an operation of the plurality of power conversion elements;
an electric storage circuit that stores the DC power by performing charging based on AC power generated by the electrical motor;
a power source circuit that supplies power based on the first DC power source or the DC power supplied from the electric storage circuit;
a voltage measurement circuit that measures a voltage of the electric storage circuit;
a second control circuit to which the power is supplied from the power source circuit and which determines whether the second DC power source is normal and outputs a second control signal configured to control the operation of the plurality of power conversion elements based on the voltage of the electric storage circuit measured by the voltage measurement circuit, when determining that the second DC power source is not normal; and
a driving circuit to which the power is supplied from the power source circuit and which outputs a driving signal configured to operate the plurality of power conversion elements based on the first or second control signal,
wherein the plurality of power conversion elements are one of power conversion elements of an upper arm connected to a high-voltage side of the first DC power source and power conversion elements of a lower arm connected to a low-voltage side of the first DC power source, and a plurality of series circuits in which the power conversion elements of the upper arm and the power conversion elements of the lower arm are connected in series are connected in parallel to the electric storage circuit with respect to the first DC power source, and
wherein, when the voltage of the electric storage circuit is greater than a predetermined first voltage value, the second control circuit outputs the second control signal configured to turn on all of one of the power conversion elements of the upper arm and the power conversion elements of the lower arm and turn off all of the other thereof.

2. The power inverter according to claim 1, wherein, when the voltage of the electric storage circuit is equal to or less than a predetermined second voltage value lower than the first voltage value, the second control circuit outputs the second control signal configured to turn off all of the power conversion elements of the upper arm and the power conversion elements of the lower arm.

3. The power inverter according to claim 1, wherein, when the second control circuit controls the second control signal and determines that the second DC power source is normal, the second control circuit interrupts the control on the second control signal.

4. The power inverter according to claim 1, further comprising:
a controlling signal output circuit that outputs a controlling signal indicating whether the second control circuit controls the second control signal to the first control circuit.

5. The power inverter according to claim 4, wherein the first control circuit does not output the first control signal, when the controlling signal output circuit outputs the controlling signal indicating that the second control circuit controls the second control signal.

6. The power inverter according to claim 1, wherein the voltage measurement circuit is realized using a microcomputer that is operated by the power supplied from the power source circuit.

* * * * *